ent Office

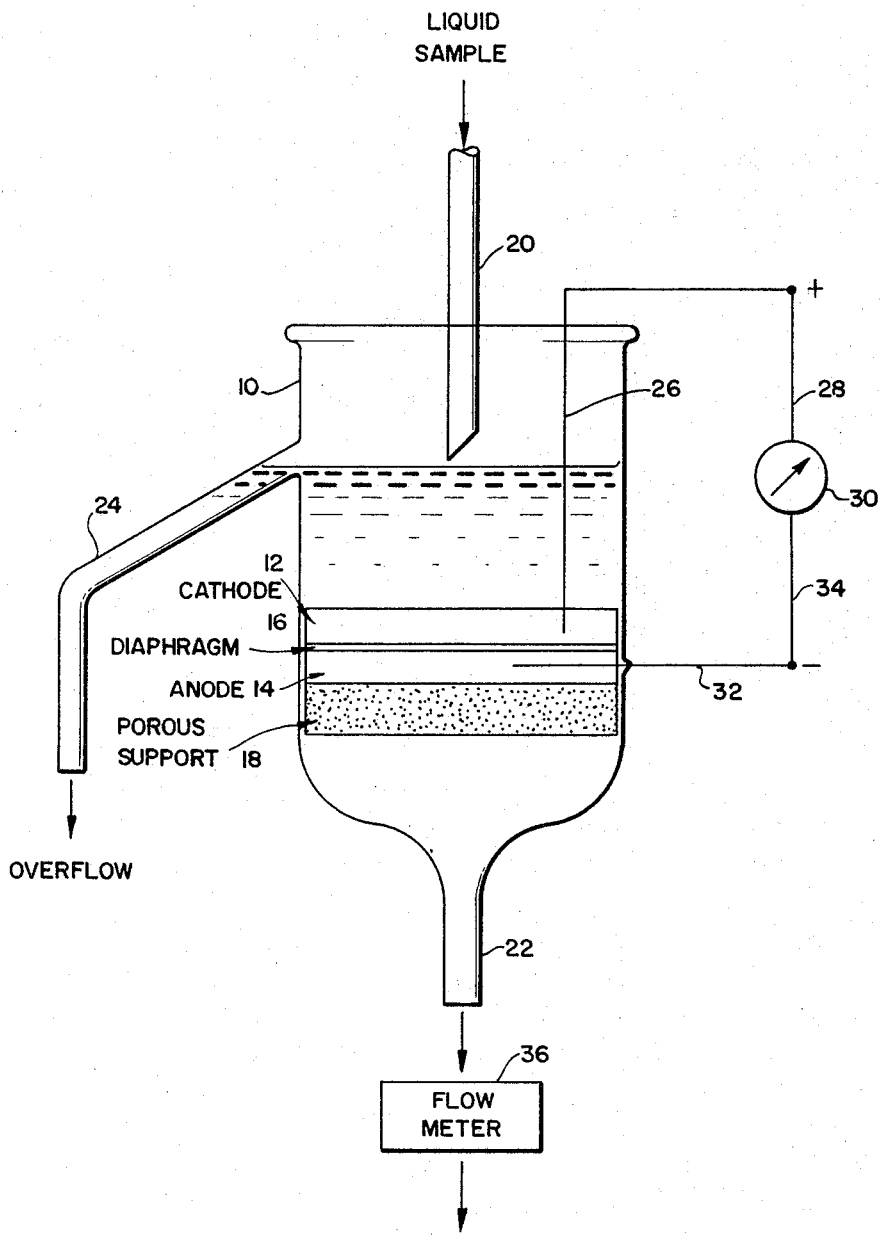

3,315,271
Patented Apr. 18, 1967

3,315,271
CELL FOR DISSOLVED OXIDANT ANALYSIS
Paul A. Hersch, Fullerton, and Rudolf Deuringer, Garden Grove, Calif., assignors to Beckman Instruments, Inc., a corporation of California
Filed Apr. 16, 1964, Ser. No. 360,339
13 Claims. (Cl. 204—195)

This invention relates to the analysis of liquids and, more particularly, to an improved galvanic monitoring process and apparatus for the continuous analysis of oxidants dissolved in a liquid sample stream.

The present invention is an improvement of the method and apparatus described in copending patent application entitled "Dissolved Oxidant Analysis," by Paul A. Hersch, Ser. No. 291,418, filed June 28, 1963, now abandoned, and assigned to the same assignee as the present application. As stated in the aforementioned patent application, there is presently a demand for a simple and inexpensive device which will provide a direct measure of dissolved oxidants in sample streams, the term "oxidant" being understood to mean an electron acceptor. One of the most important fields for use of such a device is in the measurement of disinfectants used in swimming pools, such as halogens or organic halogen donors. Some disinfectants used in the treatment of swimming pool water are halogens, such as bromine and chlorine, and organic halogen donors, such as chloramines B and T, N-chlorosuccinimide, di- and tri-chloroisocyanuric acid and mono- and dibromodimethyl-hydantoin. In the invention described in the aforementioned application, the coulometric characteristics of the galvanic cell of the invention may be maintained only by conveying the sample stream at a relatively low flow rate through the cell which results in a relatively small current output.

It is the principal object of the present invention to provide an improved method and apparatus for monitoring liquids containing dissolved oxidants which will permit a relatively high flow of sample through the apparatus and, therefore, cause a high current output, without sacrificing the coulometric characteristics of the apparatus.

Still a further object of the invention is to provide a galvanic cell for monitoring liquid samples containing dissolved oxidants in which the cell has a high ionic conductivity between the electrodes, therefore providing a rapid and complete response to changes in the level of the dissolved oxidant in the sample.

According to the principal aspect of the invention, an oxidant, such as a halogen or an organic halogen donor, dissolved in a liquid sample is carried to a galvanic cell which has positioned therein a cathode which is permeable to the sample and an anode. The sample passes through the permeable cathode thereby maximizing the contact therewith, in contrast to the cell described in the aforementioned patent application wherein the sample passes along and not of necessity through the cathode of the cell. The cathode of the cell of the invention is formed of an inert conductive material and the anode has at least a portion thereof formed of either active carbon or silver. Thus, when the halogen passes through the electrodes, the anode is electrochemically oxidized and the free energy of oxidation, coupled with the reduction of the halogen to a halide, is converted into electrical energy. The current generated in the cell is a measure of the rate of supply of the halogen and is related to this rate by Faraday's law. With this arrangement, a relatively high rate of flow of sample through the cell is permissible with an attendant high current output, without sacrificing the coulometric characteristics of the cell.

Other objects, aspects and advantages will become apparent from the following description taken in connection with the accompanying drawing which is a side view of the preferred embodiment of the galvanic cell of the present invention.

Referring now to the drawing in detail, the invention comprises a glass cell or receptacle 10, a cathode 12, an anode 14 below the cathode and separated therefrom by a porous diaphragm 16, and a porous support 18 fixed to the walls of the cell 10 for supporting the anode, cathode and diaphragm. An inlet conduit 20 is provided at the top end of the cell for directing a stream of liquid sample to be analyzed through the cell, whereas the lower end of the cell is constricted to provide an outlet 22 for the sample passing through the cell. An overflow conduit 24 opening into the cell above the cathode 12 disposes of excess sample. Preferably, the inlet conduit 20, outlet 22 and overflow conduit 24 are capillary tubes.

It is an important feature of the invention that the cathode 12 be formed of permeable material with a highly developed surface so that the sample stream passing through the voids finds a large area of contact with the cathode thereby producing a higher current output than otherwise obtainable if the sample were merely passed along the surface of the cathode.

The cathode 12 and anode 14 may be formed of the same materials as described in the aforementioned patent application or from certain other materials as will be described later. It is essential that the cathode be formed of an inert conductive material such as inactive carbon or a noble metal, for example, platinum. If the cathode is formed of a metal such as platinum it could be given a large surface area by providing a multilayer screen of platinum which would permit the flow permit the flow flow of sample therethrough. For a carbon cathode, the cathode may take the form of an inactive carbonaceous fibrous material such as graphite cloth or graphite felt. These materials may perform more effectively if provided with a catalytically active metal. For example, the graphite cloth or felt could be impregnated or coated or otherwise provided with a metal such as platinum. It is obvious that when carbonaceous fibrous materials are utilized as the cathode even when treated with catalytic active metals, the expense is much less than that of a pure platinum cathode.

The anode must have some portion thereof formed of active carbon or silver so that when the sample stream passes through the cathode and reaches the anode, the anode will readily undergo anodic oxidation and, unlike the cathode, not merely catalyze and conduct electronically. Preferably the anode is permeable to the sample liquid so that the sample stream may pass through both the cathode and anode. However, the anode could be non-permeable and arranged so that the sample stream merely passes along the anode rather than through it. The anode may be formed of a silver screen or a body of active carbon, but preferably is formed of a carbonaceous fibrous material which may be active, or inactive but impregnated with particles of active carbon or silver.

The support 18 for the cathode 12 and anode 14 is a porous inert material such as a body of sintered glass fixed to the walls of the cell 10 by fusing. It is obvious, however, that the support would not be necessary if the the cathode 12 and anode 14 could be otherwise rigidly mounted in the cell. The diaphragm 16 which separates the cathode 12 and anode 14 serves to maintain the electrodes in spaced apart relationship and may be in the form of any suitable insulating porous material such as glass fiber paper or a sheet of porous polyvinyl chloride. The thin diaphragm 16 maintains the electrodes spaced apart yet in close proximity, thereby ensuring a low cell resistance even when the sample fluid is poorly conducting. It has been found that a low cell resistance favors a rapid speed of response to changing levels of oxidants in the sample.

In the apparatus of the aforementioned earlier application the relative position of the electrodes was such that a possibility was left for a minor portion of the sample to diffuse towards the anode without having first sufficiently contacted the cathode. Such diffusion results in an output lower than the theoretical maximum even if the cathode is a good catalyst and has a highly developed surface. In the present cell no fluid can reach the anode 14 before having filtered through the cathode 12.

In order to measure the current generated in the electrochemical process resulting from the dissolved oxidant entering the cell, a conductor 26 reaching into the cathode body is connected to wire 28 which is attached to the positive terminal of a current measuring device 30, such as a galvanometer or microammeter. A second conductor 32 extending through the wall of the cell 10 and reaching into the anode body is connected to a second wire 34 attached to the negative terminal of the current measuring device 30. Also, a flowmeter 36 is provided at the effluent end of the cell to measure the flow of fluid passing through the cell, which value is necessary in the determination of the dissolved oxidant concentration of the sample stream.

In the operation of this apparatus, the liquid sample, for example, the water from a swimming pool containing any of the disinfectants mentioned above, is made to enter the tube 20 by means of a pump, or feeding device operating on gravity (not shown). The sample flows through the inlet conduit 20 into the upper portion of the cell 10 and then passes through the permeable cathode 12, diaphragm 16, anode 14 and porous support 18 and out through the tube 22. The liquid sample generally has sufficient conductivity to act as an electrolyte when it passes through the cell. Generally, no separate body of electrolyte is provided within the cell. However, for waters very poor in salt content or too high in pH, a strong salt or, respectively, acid solution may have to be bleeded into the cell by conventional means. The chlorine, bromine, halogen donor or other oxidant is reduced at the cathode 12, picking up electrons from the circuit of the cell, while at the same time the anode 14, if formed of active carbon, acquires oxygen ions from its environment and releases their electrons into the circuit, retaining the oxygen atom. If the anode contains silver, silver halide is formed at the anode. Since the flowmeter 36 measures the flow rate of sample passing through the cell, the dissolved oxidant content of the sample may be readily determined by merely noting the flow rate of sample and measuring the current flowing in the circuit of the cell and then applying Faraday's law. Hence, the cell is a coulometric device operating without requiring calibration nor a separate body of electrolyte. Besides, the device requires no external source of power.

The cell has the advantage that it permits a high flow of sample liquid, hence a high current signal, without sacrificing the coulometric characteristics of the cell. The high flow of sample without loss of current yield is possible because of the relative position of the electrodes and the high surface area of the cathode. The advantage of the arrangement of the electrodes in the cell of the present invention may be best understood by considering the following. In a flow cell for determining dissolved chlorine, the signal generated by the cell may be expressed by the formulae $$i = 45.3FX \quad (1)$$

if the cell is coulometric and $$i = 45.3FX(1 - e^{-AV/F}) \quad (2)$$

where the cell is not coulometric where $i$ (in $\mu A$) is the galvanic current output of the cell; $F$ (in ml./min.) is the flow rate of the sample fluid; $X$ (in weights per million) is the concentration of the oxidant in the sample fluid; $A$ (in minutes$^{-1}$) is a parameter depending on the nature and extent of the cathode surface, the ionic resistance between the two electrodes, and the temperature; and $V$ (in ml.) is the aggregate volume of the voids inside the cathode body. The same formulae apply to oxidants other than chlorine, except for the numerical factor 45.3. It can be appreciated that when the term $AV/F$ becomes very large, the Equation 2 approaches Equation 1 which is highly desirable since, in the case of a coulometric cell, unlike the case when the cell is not coulometric, the current does not depend on the individuality of the cell, that is, neither on $A$ nor on $V$. In this case, there is no need for calibration, nor does the current in Equation 1 depend on the temperature. It is always possible to make the galvanic flow cell behave according to a coulometric cell by making $F$ very small, but then the current output of the cell is very small and then the cell is coulometric but insensitive. Rather, one should not curtail the sample flow $F$ but, instead, make $A$ and $V$ large. This has been accomplished by the novel construction of the present invention. The term $V$ in Equation 2 has been enlarged by enlarging the width rather than the depth of the cathode 12. Otherwise, if the depth of the cathode were enlarged the ionic resistance of the cell would be increased. Thus, it is best that the permeable cathode extends completely across the cell 10 thereby maximizing the exposed surface to the fluid sample while maintaining the thickness of the cathode in the direction of flow of the liquid sample within moderate limits. When the parameter $V$ is increased as described above, and the parameter $A$ is also increased by using such suitable materials as carbonaceous fibrous bodies described above, a high product $AV$ is obtained, compensating for a relatively high flow rate $F$ of sample fluid. Hence, the term $AV/F$ may be made sufficiently large even with a high flow rate of sample for $e^{-AV/F}$ to be negligible. In this way, the flow rate can readily be maintained at a constant value sufficient in magnitude to measure both flow and current comfortably with inexpensive measuring devices. For alarm and control purposes, simpler and less costly relays can be used with the cell of the present invention because of its larger current signal. Thus, there is provided by the present invention a galvanic cell which generates a relatively large current with quick response for monitoring dissolved oxidants in sample streams without sacrificing the coulometric characteristics of the cell.

Although several embodiments of the invention have been disclosed herein for purposes of illustration, it will be understood that various changes can be made in the form, details and arrangement and proportions of the various parts in such embodiments without departing from the spirit and scope of the invention as defined by the appended claims.

What is claimed is:

1. A galvanic cell adapted to monitor a liquid sample stream containing a dissolved oxidant comprising:

a cell having an inlet and an outlet defining therebetween a sample flow path;

a cathode and an anode spaced apart in said cell with said cathode being adjacent to said inlet but remote from said outlet and said anode being adjacent to said outlet but remote from said inlet;

said cathode extending substantially completely across said cell transverse to said sample flow path with the thickness of said cathode in the direction of said sample flow path being substantially less than the thickness of said cathode in the direction transverse to said flow path;

said cathode being formed of an inert conductive material and said anode having at least a portion thereof selected from the group consisting of silver and active carbon, and said cathode being porous whereby said liquid sample stream may pass through said cathode to said anode; and means for connecting said anode and said cathode to a current measuring means.

2. A galvanic cell as set forth in claim 1 wherein said cathode has at least a portion thereof formed of a material selected from the group consisting of platinum and inactive carbon.

3. A galvanic cell as set forth in claim 1 wherein said cathode has at least a portion thereof formed of inactive carbonaceous fibrous material.

4. A galvanic cell as set forth in claim 1 wherein said cathode is formed of an inactive carbonaceous fibrous material carrying a catalytic active metal.

5. A galvanic cell as set forth in claim 1 wherein said anode is porous whereby said liquid sample stream may pass through both said cathode and said anode.

6. A galvanic cell as set forth in claim 1 wherein said anode is formed of a porous fibrous material of active carbon.

7. A galvanic cell as set forth in claim 1 wherein said anode is formed of a porous carbonaceous fibrous material with said portion selected from the group of active carbon and siver being disposed in said fibrous material.

8. A galvanic cell as set forth in claim 1 wherein said anode is in juxtaposition with said cathode and a porous insulating material is interposed between said anode and said cathode.

9. A galvanic cell adapted to monitor a liquid sample stream containing a dissolved oxidant comprising:
a cell having an inlet and an outlet defining therebetween a sample flow path;
a cathode and an anode in juxtaposition yet spaced apart in said cell with said cathode being adjacent to said inlet but remote from said outlet and said anode being adjacent to said outlet but remote from said inlet;
said cathode extending substantially completely across said cell transverse to said sample flow path with the thickness of said cathode in the direction of said sample flow path being substantially less than the thickness of the cathode in the direction transverse to said flow path;
said cathode being formed of an inert conductive material and said anode having at least a portion thereof selected from the group consisting of silver and active carbon, and said cathode being porous whereby said liquid sample stream may pass through said cathode and anode; and
means for connecting said anode and said cathode to a current measuring means.

10. A galvanic cell as set forth in claim 9 wherein said anode is formed of a porous material and extends substantially completely across said cell transverse to said flow path.

11. A galvanic cell adapted to monitor a liquid sample stream containing a dissolved oxidant comprising:
a cell having an inlet and an outlet defining therebetween a sample flow path;
a cathode and an anode in juxtaposition in said cell with said cathode being adjacent to said inlet but remote from said outlet and said anode being adjacent to said outlet but remote from said inlet and a porous insulating material being interposed between said anode and said cathode;
said anode and said cathode extending substantially completely across said cell transverse to said sample flow path with the thickness of said cathode in the direction of said sample flow path being substantially less than the thickness of said cathode in the direction transverse to said flow path;
said cathode being formed of an inert conductive material and said anode having at least a portion thereof selected from the group consisting of silver and active carbon, and said anode and said cathode being porous whereby said liquid sample stream may pass through said cathode and anode; and
means for connecting said anode and said cathode to a current measuring means.

12. A galvanic cell adapted to monitor a liquid sample stream containing a dissolved oxidant comprising:
A substantially vertical cell having an inlet adjacent the top portion thereof and an outlet adjacent the bottom portion of said cell defining between said inlet and said outlet a sample flow path;
a cathode and an anode in juxtaposition in said cell with said cathode being adjacent to said inlet and said anode being adjacent to said outlet, and a porous insulating material being interposed between said anode and said cathode;
said cathode extending substantially completely across said cell transverse to said sample flow path;
said cathode being formed of an inert conductive material and said anode having at least a portion thereof selected from the group consisting of silver and active carbon, and said anode and said cathode being permeable to said liquid sample whereby said liquid sample stream may pass through said cathode and anode;
porous supporting means fixedly positioned in said cell between said anode and said outlet for supporting said anode and said cathode; and
means for connecting said anode and said cathode to a current measuring means.

13. A galvanic cell as set forth in claim 11 wherein said cathode is a porous carbonaceous fibrous material and said anode is a silver screen.

References Cited by the Examiner
UNITED STATES PATENTS

| | | | |
|---|---|---|---|
| 2,414,411 | 1/1947 | Marks | 204—195 |
| 2,651,612 | 9/1953 | Haller | 204—195 |
| 2,851,655 | 9/1958 | Haddad | 204—195 |
| 3,028,317 | 4/1962 | Wilson et al. | 204—195 |
| 3,051,631 | 8/1962 | Harbin et al. | 204—195 |
| 3,117,034 | 1/1964 | Tirrell | 136—86 |
| 3,223,608 | 12/1965 | Hersch | 204—195 |
| 3,236,759 | 2/1966 | Robinson | 204—195 |

JOHN H. MACK, *Primary Examiner.*

T. H. TUNG, *Assistant Examiner.*